US012798458B2

(12) United States Patent
Sprenger

(10) Patent No.: US 12,798,458 B2
(45) Date of Patent: Nov. 17, 2026

(54) LONGITUDINALLY ADJUSTABLE ARMREST ARRANGEMENT FOR A VEHICLE SEAT

(71) Applicant: Adient US LLC, Plymouth, MI (US)

(72) Inventor: Erik Sprenger, Wermelskirchen (DE)

(73) Assignee: Adient US LLC, Plymouth, MI (US)

(*) Notice: Subject to any disclaimer, the term of this patent is extended or adjusted under 35 U.S.C. 154(b) by 51 days.

(21) Appl. No.: 18/926,449

(22) Filed: Oct. 25, 2024

(65) Prior Publication Data

US 2025/0135976 A1 May 1, 2025

(30) Foreign Application Priority Data

Oct. 25, 2023 (DE) ..................... 10 2023 210 530.6
Jan. 17, 2024 (DE) ..................... 10 2024 200 420.0

(51) Int. Cl.
*B60N 2/75* (2018.01)
*B60N 3/00* (2006.01)
*B60N 3/10* (2006.01)

(52) U.S. Cl.
CPC ............. *B60N 2/773* (2018.02); *B60N 2/763* (2018.02); *B60N 2/767* (2018.02); *B60N 2/777* (2018.02); *B60N 3/001* (2013.01); *B60N 3/102* (2013.01)

(58) Field of Classification Search
CPC ........ B60N 2/773; B60N 2/763; B60N 2/767; B60N 2/777; B60N 3/001; B60N 3/102; B60N 2/77
USPC ................................ 297/115, 411.35–411.39
See application file for complete search history.

(56) References Cited

U.S. PATENT DOCUMENTS

| | | | | |
|---|---|---|---|---|
| 8,002,357 | B2 * | 8/2011 | Cebula | B60N 2/753 297/411.32 |
| 8,201,901 | B2 * | 6/2012 | Craddock | A47C 27/07 312/334.17 |
| 11,285,850 | B2 * | 3/2022 | Gayon | B60N 2/797 |
| 12,090,896 | B2 * | 9/2024 | Gregor | B60N 2/682 |
| 12,115,892 | B2 * | 10/2024 | Lee | B60N 2/797 |
| 12,565,319 | B2 * | 3/2026 | Hoover | B64D 11/0644 |
| 2013/0153447 | A1 * | 6/2013 | Cinco | B60N 2/793 248/118 |
| 2022/0371494 | A1 * | 11/2022 | Mergl | B60R 16/037 |
| 2023/0365039 | A1 * | 11/2023 | Martinka | B60N 2/753 |

FOREIGN PATENT DOCUMENTS

| | | | | |
|---|---|---|---|---|
| CN | 119872375 | A * | 4/2025 | B60N 2/773 |
| DE | 10110330 | A1 | 10/2002 | |
| DE | 102004048701 | A1 | 4/2006 | |
| DE | 102015224877 | A1 | 10/2016 | |
| DE | 102020200867 | A1 | 4/2021 | |

* cited by examiner

*Primary Examiner* — Robert Canfield
(74) *Attorney, Agent, or Firm* — Marshall & Melhorn, LLC

(57) ABSTRACT

An armrest device for a vehicle seat may have at least one armrest and an armrest rail arrangement, which is configured for longitudinal adjustment of the armrest out of a base position into an extended position. The armrest rail arrangement may have at least one fixed armrest rail and an armrest rail which is longitudinally adjustable relative to the fixed armrest rail, and a gear unit. The armrest rail arrangement may be arranged on the armrest relative to the longitudinal direction such that a drive interface of the gear unit is oriented downward or upward or in an intermediate position. A vehicle seat having the arm rest is also provided.

9 Claims, 9 Drawing Sheets

LONGITUDINALLY ADJUSTABLE ARMREST ARRANGEMENT FOR A VEHICLE SEAT

FIELD

The invention concerns an armrest device for a seat, in particular a vehicle seat, and a seat, in particular a vehicle seat, with such an armrest device.

BACKGROUND

In general, armrests are known from the prior art which are for example height-adjustable, in particular foldable or pivotable.

The invention is based on the object of improving an armrest of the type cited initially, in particular with respect to improving an adjustability, and providing a corresponding vehicle seat.

The first-mentioned object is achieved according to the invention by an armrest device with the specified features of the claims. The second-mentioned object is achieved according to the invention by a seat, in particular a vehicle seat, which has the specified features of the claims.

SUMMARY

An armrest device according to the invention comprises at least one armrest with an armrest rail arrangement, which is configured for translational longitudinal adjustment of the armrest out of a base position into an extended position, wherein the armrest rail arrangement comprises at least one fixed armrest rail and an armrest rail which is movable, in particular longitudinally adjustable, relative to the fixed armrest rail, and a gear unit, and wherein the armrest rail arrangement is arranged on the armrest relative to the longitudinal direction such that a drive interface of the gear unit is oriented downward or upward, for example in the direction of the vehicle seat, or for example inward in the direction of the vehicle seat, in particular a seat structure of the vehicle seat, or in an intermediate position.

With such an orientation of the drive interface of the gear unit, an armrest drive unit may be arranged outside the armrest, for example on the vehicle seat, in particular below the vehicle seat, or on a long side of the vehicle seat.

In other words, the armrest comprises only the armrest rail arrangement and the gear unit, which is couplable via the drive interface to an armrest drive unit, for example a motorized armrest drive unit with a flexible output shaft. The armrest rail arrangement may for example be rotated about a longitudinal axis. In this way, the drive interface, in particular a flexible shaft interface (also called a flexible shaft input) may be arranged more downward than directly inward. The armrest rail arrangement may for example be rotated through a region from 30° to 90° or up to 180°. On a rotation by 90° or 180°, the drive interface for coupling to the flexible output shaft of the armrest drive unit points directly downward. The armrest rail arrangement may also be oriented as a mirror image about a horizontal plane or vertically.

The armrest rail arrangement may be oriented parallel to a horizontal plane.

Alternatively, the armrest rail arrangement may be oriented rotated about a longitudinal axis. The armrest rail arrangement may be oriented tilted about the horizontal plane.

The armrest rail arrangement may be arranged on an underside of the armrest opposite an arm support surface.

The armrest rail arrangement may be arranged and fastened inside the armrest, for example inside an armrest carrier and/or an armrest padding. Thus a compact and visually improved armrest may be provided.

A number of function modules may be arranged in a cavity of the armrest above the armrest rail arrangement.

The number of function modules may comprise at least a table, a beverage holder, a control unit and/or an adjustment switch for longitudinal adjustment of the armrest.

The armrest rail arrangement may comprise an armrest drive unit which is couplable or can be coupled to the gear unit via the drive interface.

The armrest drive unit may be arranged below or in the region of the armrest rail arrangement and be couplable or coupled to the gear unit via a flexible drive shaft. In this way, the armrest may be provided only with the armrest rails and the gear unit and be formed compactly.

The seat according to the invention, in particular a vehicle seat, comprises at least one armrest with the above-described armrest rail arrangement, which is configured for a translational longitudinal adjustment of the armrest out of a base position into an extended position. Preferably, on each seat side, the vehicle seat comprises such an armrest and an armrest drive unit which is arranged below a seat structure and from which at least one flexible output shaft originates, which is couplable or coupled to the gear unit of the armrest. In the case of two armrests, two flexible output shafts are provided, which are couplable or coupled to the two gear units and each originate from an end of the armrest drive unit, which is in particular arranged in the middle or centrally. The respective output shaft may be couplable or coupled in arcuate form to one of the gear units.

The armrest device may comprise two armrests which may each be provided with an armrest rail arrangement, wherein an armrest drive unit of the armrest rail arrangement may be arranged below or in the region of a seat structure of the seat cushion. The armrest drive unit may have a flexible drive shaft on both sides, in particular at the respective end, wherein the respective flexible drive shaft is couplable or can be coupled to an associated gear unit of the respective armrest rail arrangement. In this way, only one drive unit need be provided for actuating two armrest rail arrangements, saving installation space and costs.

The armrests are thus equipped with a longitudinal adjustment function which can adjust both armrests simultaneously. This may achieve a convenient access and exit function ("Welcome" function, "Farewell" function), in which the armrests slide to the rear by 150 mm for example, for easier access to and exit from the seat. If the seat is for example moved fully forward to allow access to the rear seat row, the adjustable armrests may avoid a collision with the center console, wherein an access dimension can easily be increased. Also, when the occupant is in a reclined position, the armrests can be moved to the rear to follow a movement of the occupant's torso into the reclined position.

The gear unit may for example be configured as a spindle gear with a spindle and a spindle nut. The spindle is fixedly connected to the movable armrest rail. The spindle nut is mounted movably, in particular rotatably, in the fixed armrest rail. The fixed armrest rail may for example be arranged on and fastened to a seat structure, in particular a backrest structure or a seat cushion structure, and/or on a bracket fixed to the floor. The spindle is axially movably mounted via the spindle nut. The spindle thus carries with it the armrest which is fixedly connected thereto. The at least one flexible output shaft may be directly coupled to the spindle nut. Alternatively, the flexible output shaft may be coupled to a drive screw which in turn drives the spindle nut.

DESCRIPTION OF THE FIGURES

The invention is explained in more detail below with reference to advantageous exemplary embodiments illustrated in the figures. The invention is not however restricted to these exemplary embodiments. In the drawings.

DETAILED DESCRIPTION

Corresponding parts carry the same reference signs in all figures.

Figure 1:
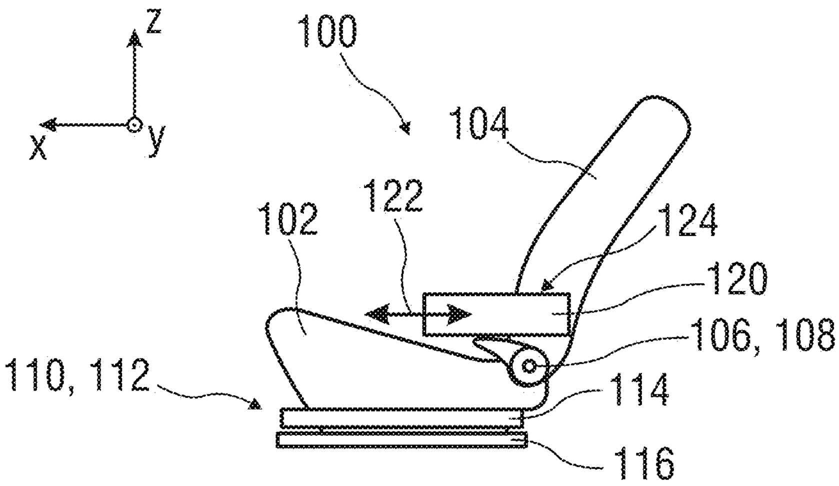
FIG. 1: shows schematically a vehicle seat with a longitudinal adjustment device with a longitudinally adjustable armrest.

A vehicle seat 100, illustrated schematically in FIG. 1, is described below with reference to three mutually perpendicular spatial directions. When a vehicle seat 100 is installed in the vehicle, a longitudinal direction x runs largely horizontally and preferably parallel to a vehicle longitudinal direction, which corresponds to the usual direction of travel of the vehicle. A transverse direction y running perpendicularly to the longitudinal direction x is also oriented horizontally in the vehicle and runs parallel to a vehicle transverse direction. A vertical direction z runs perpendicularly to the longitudinal direction x and perpendicularly to the transverse direction y. When a vehicle seat 100 is installed in the vehicle, the vertical direction z preferably runs parallel to a vehicle vertical axis.

The positional and directional terms used, such as front, rear, top and bottom, relate to a viewing direction of an occupant seated in the vehicle seat 100 in the normal seating position, wherein the vehicle seat 100 is installed in the vehicle in a usage position suitable for transport of persons, with upright backrest 104, and oriented as usual in the direction of travel. The vehicle seat 100 may however be installed or moved in a different orientation, e.g. transversely to the direction of travel. Unless described otherwise, the vehicle seat 100 is constructed mirror-symmetrically to a plane running perpendicularly to the transverse direction y.

The backrest 104 may be arranged pivotably on a seat cushion 102 of the vehicle seat 100. For this, the vehicle seat 100 may optionally comprise a control fitting 106, in particular a setting control, a rotary control, a latching control or a rocker control.

The positional and directional terms used, such as e.g. radial, axial and circumferential, relate to a rotational axis 108 of the control fitting 106. Radial means perpendicular to the rotational axis 108. Axial means in the direction of or parallel to the rotational axis 108.

The vehicle seat 100 may optionally comprise a longitudinal adjustment device 110. The longitudinal adjustment device 110 comprises for example a rail arrangement 112 with a first rail element 114 and a second rail element 116. The first rail element 114 is adjustable in the longitudinal direction x relative to the second rail element 116. The first rail element 114 is attached to the seat cushion 102. The second rail element 116 is attached to a structural element of a vehicle, e.g. a vehicle floor 118 (illustrated in FIG. 4).

For greater clarity, the first rail element 114 is referred to in the following description as the top rail 114. The top rail 114 (also called the running rail or slide) is assigned to the vehicle seat 100 and configured to carry this vehicle seat 100. The second rail element 116 is referred to below as the lower rail 116. The lower rail 116 is fixed and e.g. connected to the floor of a vehicle.

Furthermore, the vehicle seat 100 comprises at least one armrest 120 (also called the longitudinally adjustable or axially adjustable armrest 120), which is adjustable following the arrow 122 in the longitudinal direction x and is described in more detail below.

The armrest 120 runs substantially in the longitudinal direction x. Depending on equipment level, the armrest 120 comprises at least an arm support surface 124, viewed in the vertical direction z onto the armrest 120.

Figure 2:
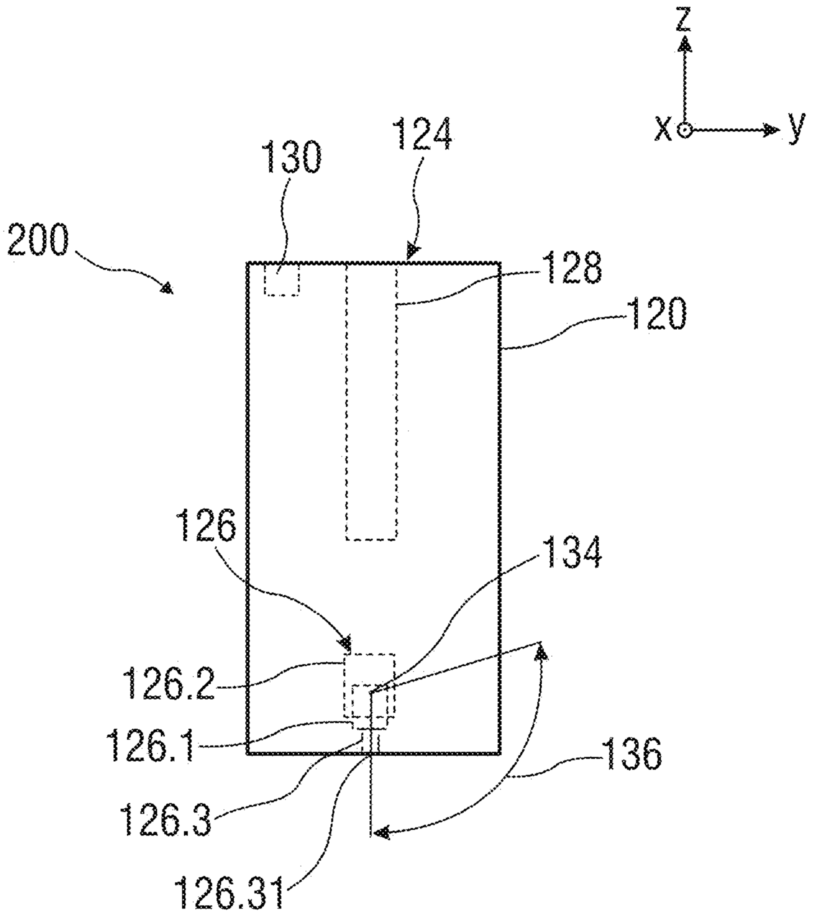
FIG. 2: shows a partially transparent top view of an armrest.

FIG. 2 shows a partially transparent top view of an armrest 120 according to the invention.

The armrest 120 comprises at least the arm support surface 124 for supporting an arm of a user of the vehicle seat 100 shown in FIG. 1.

For longitudinal adjustment of the armrest 120, this comprises at least one armrest rail arrangement 126.

In particular, an armrest device 200 is formed which comprises the armrest 120 and the armrest rail arrangement 126 for longitudinal adjustment of the armrest 120.

Optionally, depending on equipment level, the armrest 120 may comprise at least one further function module 128, in particular a movable, in particular lowerable or foldable table, a beverage holder, a control unit or similar. In addition, the armrest 120 may comprise at least one adjustment switch 130 for longitudinal adjustment of the armrest 120 and/or the vehicle seat 100. In particular, separate adjustment switches 130 for the armrest 120 and the vehicle seat 100 may be integrated in the armrest 120.

The armrest rail arrangement 126 is configured for a translational longitudinal adjustment of the armrest 120 out of a base position into an extended position, viewed in the longitudinal direction x. The armrest rail arrangement 126 comprises at least one fixed armrest rail 126.1 and an armrest rail 126.2 which is movable, in particular longitudinally adjustable, relative to the fixed armrest rail 126.1, and a gear unit 126.3.

Figure 4:
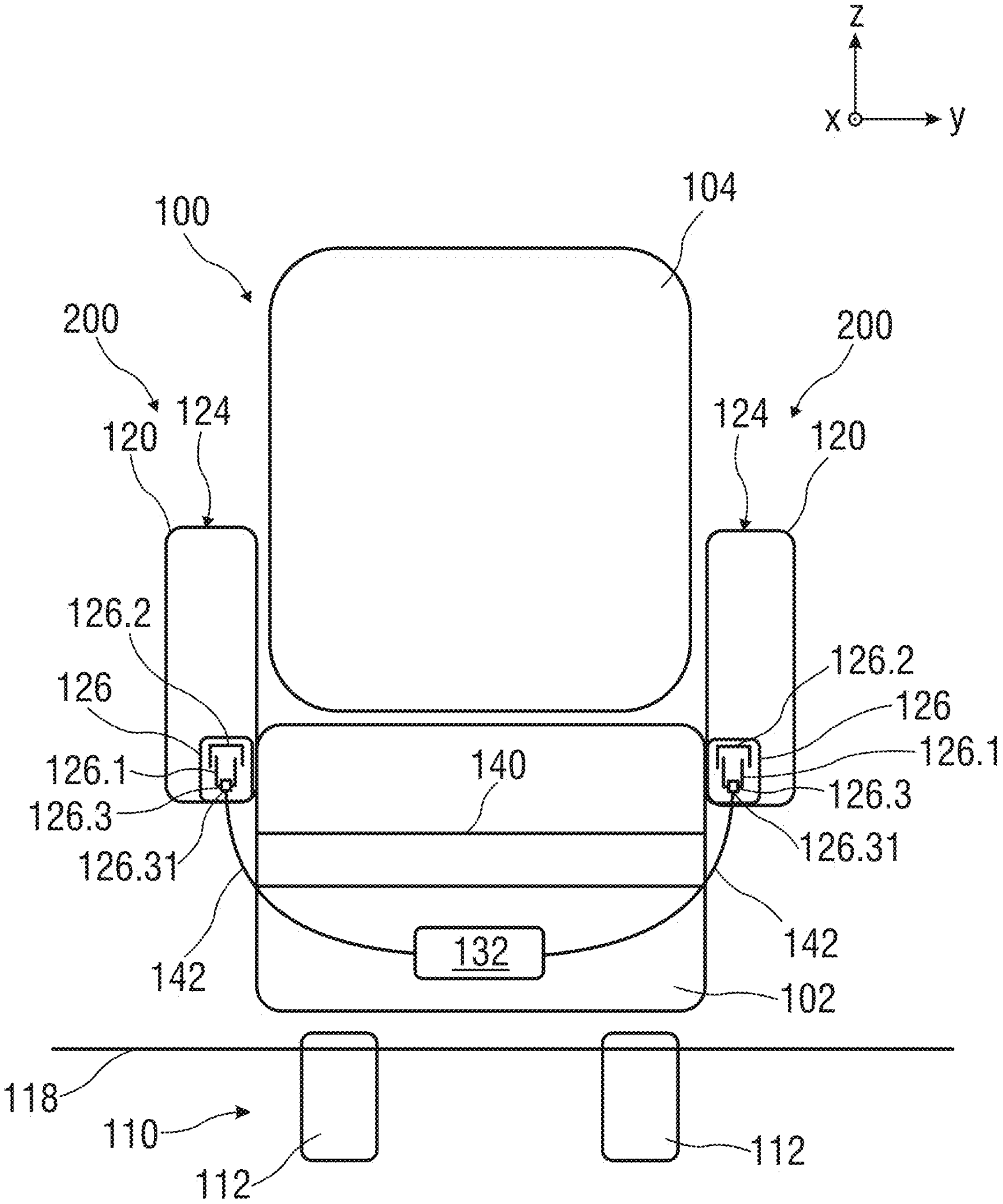
FIG. 4: shows a top view of the vehicle seat with two longitudinally adjustable armrests and a central armrest drive unit.

The armrest rail arrangement 126 is arranged on the arm rail 120 relative to the longitudinal direction x such that a drive interface 126.31 of the gear unit 126.3 is oriented downward, as shown in FIGS. 2 and 4, or in the direction of the vehicle seat 100, in particular inward in the direction of the vehicle seat 100, or in an intermediate position.

The armrest 120 thus comprises only the armrest rail arrangement 126 and the gear unit 126.3, which is couplable to an armrest drive unit 132 (shown in FIG. 4), for example a motorized armrest drive unit 132, via the drive interface 126.31. The armrest rail arrangement 126 may be rotated for example about a longitudinal axis 134 running in the longitudinal direction x. Thus, the drive interface 126.31 may be arranged more downward than directly inward.

The armrest rail arrangement 126 may be arranged inside the armrest 120, rotated for example through a region 136 of 30° to 90°, or up to 180° relative to the longitudinal axis 134. On rotation about 90° or 180°, the drive interface 126.31 for coupling to the armrest drive unit 132 points inward in the direction of the vehicle seat 100 or vertically downward.

The armrest rail arrangement 126 is in particular arranged on and attached to an underside 120.1 of the armrest 120 opposite the arm support surface 124, inside the armrest 120.

At least one of the function modules 128 may be arranged in a cavity of the armrest 120 above the armrest rail arrangement 126.

Figure 3:
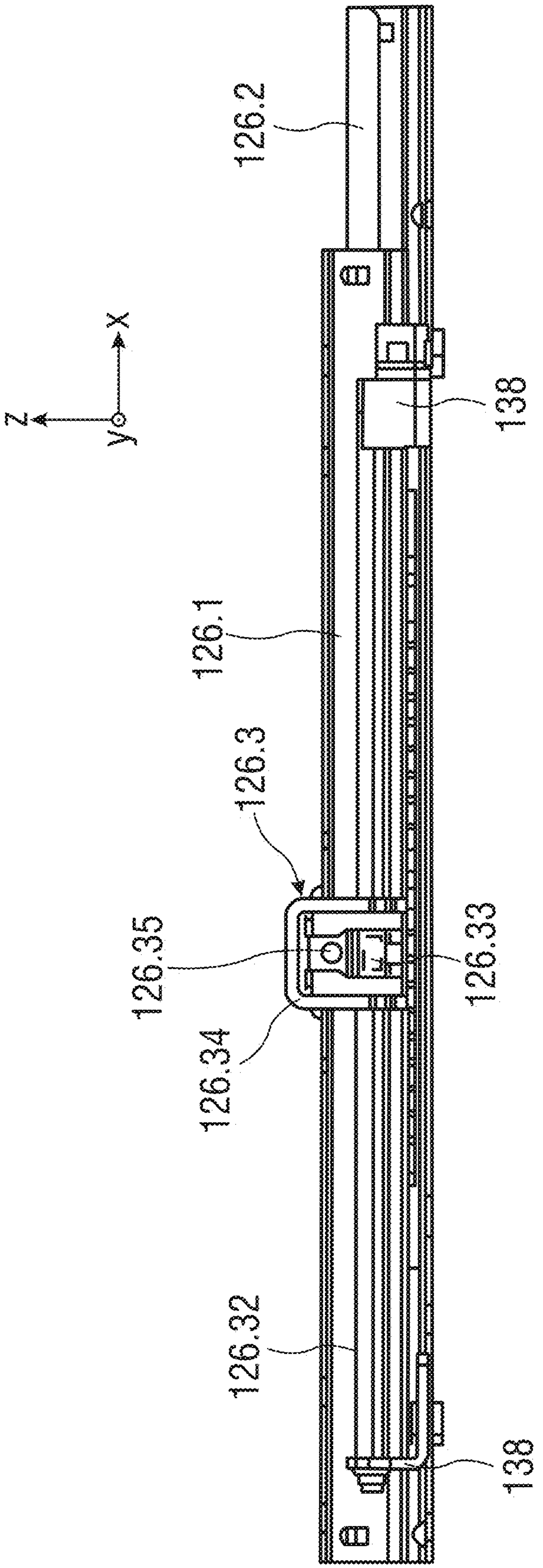
FIG. 3: shows a side view of an armrest rail arrangement for the armrest.

FIG. 3 shows a side view of the armrest rail arrangement 126 for the armrest 120.

The armrest rail arrangement 126 comprises the fixed armrest rail 126.1 and the armrest rail 126.2 which is movable relative thereto, and the gear unit 126.3.

The gear unit 126.3 is configured for example as a spindle gear with a spindle 126.32 and a spindle nut 126.33.

The spindle 126.32 is fixedly connected to the movable armrest rail 126.2. For example, at least two spindle holders 138 are provided which connect the spindle 126.32 to the movable armrest rail 126.2. The spindle 126.32 and the movable armrest rail 126.2 are thereby coupled together in movement.

The spindle nut 126.33 is movably, in particular rotatably mounted in the fixed armrest rail 126.1. For this, the gear unit 126.3 comprises a gear housing 126.34, which is held by form fit and/or force fit in the fixed armrest rail 126.1. The gear housing 126.34 comprises a rotary bearing for the spindle nut 126.33. The spindle nut 126.33 can be driven via a drive screw 126.35.

The spindle 126.32 is mounted via the spindle nut 126.33 so as to be axially movable relative thereto and to the gear housing 126.34 and the fixed armrest rail 126.1. Here, the spindle 126.32 carries with it the armrest 120 which is fixedly connected thereto.

FIG. 4 shows a top view, for example from the front, of the vehicle seat 100 with the backrest 104 and the seat cushion 102, and two longitudinally adjustable armrests 120 on the two sides of the vehicle seat 100. The vehicle seat 100 is adjustable in the longitudinal direction x relative to the vehicle floor 118 by means of the longitudinal adjustment device 110, which comprises the two rail arrangements 112 and is arranged for example in a vehicle floor 118.

The vehicle seat 100 comprises two armrests 120 which are each provided with the above-described armrest rail arrangement 126, which is configured for a translational, longitudinal adjustment of the respective armrest 120 out of a base position into an extended position. The respective armrest 120 comprises the upwardly oriented arm support surface 124. The armrest rail arrangement 126 is arranged on an underside 120.1 of the respective armrest 120. The respective armrest rail arrangement 126 is oriented parallel to the arm support surface 124 and/or to the underside 120.1 and/or parallel to a horizontal plane 144. In particular, the respective armrest rails 126.1, 126.2 are oriented parallel to the arm support surface 124 and/or to the underside 120.1 and/or parallel to a horizontal plane 144.

The armrest drive unit 132 is arranged below or in the region of a seat structure 140 of the seat cushion 102. The armrest drive unit 132 may be arranged centrally on the seat cushion 102.

A flexible output shaft 142 originates from each end of the armrest drive unit 132. Depending on configuration of the vehicle seat 100, only one armrest 120 may be provided; in this case, only one flexible output shaft 142 originates from the armrest drive unit 132. The armrest drive unit 132 is for example configured as an electric motor.

The respective flexible output shaft 142 is couplable or coupled to the associated gear unit 126.3. Here, the respective flexible output shaft 142 may be couplable or coupled in arcuate form to the associated gear unit 126.3. Because of the orientation of the drive interface 126.31 of the gear unit 126.3, downward or inward in the direction of the seat cushion 102 or in between, in any arbitrary position in the region 136 (illustrated in FIG. 3), the armrest drive unit 132 may be arranged outside the armrest 120, e.g. on the vehicle seat 100, in particular below the vehicle seat 100 or on a long side of the vehicle seat 100.

The fixed armrest rail 126.1 may for example be arranged on and attached to the seat structure 140 or optionally to a backrest structure or to a floor-mounted bracket (not shown). The at least one flexible output shaft 142 may be coupled directly to the spindle nut 126.33 (illustrated in FIG. 3). Alternatively, the flexible output shaft 142 may be coupled to the drive screw 126.35 (illustrated in FIG. 3), which in turn drives the spindle nut 126.33 (illustrated in FIG. 3).

Figure 5:
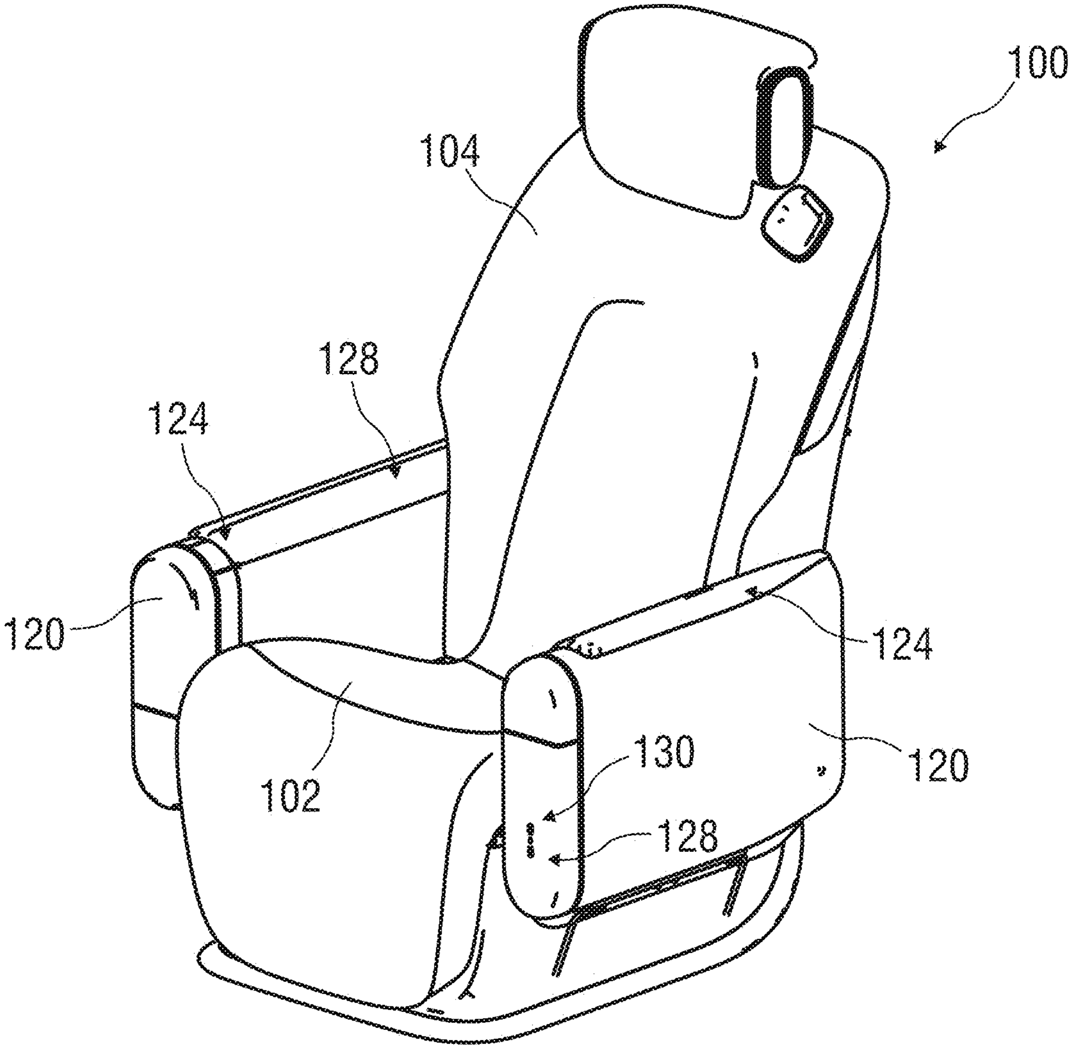
FIG. 5: shows a perspective view of an upholstered vehicle seat with two longitudinally adjustable armrests.

FIG. 5 shows a perspective view of an upholstered vehicle seat 100 with two longitudinally adjustable armrests 120.

The vehicle seat 100 comprises at least one backrest 104 and a seat cushion 102. An armrest 120 may be arranged on each side of the vehicle seat 100, adjacent to the backrest 104 and seat cushion 102. The armrests 120 may be different or similar in their dimensions, e.g. in width, length and/or height. At least one of the armrests 120 may, depending on equipment level, have at least one function module 128, e.g. a movable, in particular lowerable or foldable table, a beverage holder, a control unit or similar. In addition, at least one of the armrests 120 may comprise at least one adjustment switch 130 for a longitudinal adjustment of the armrest 120 and/or of the vehicle seat 100. In particular, separate adjustment switches 130 for the armrest 120 and the vehicle seat 100 may be integrated in the armrest 120.

Figure 6:
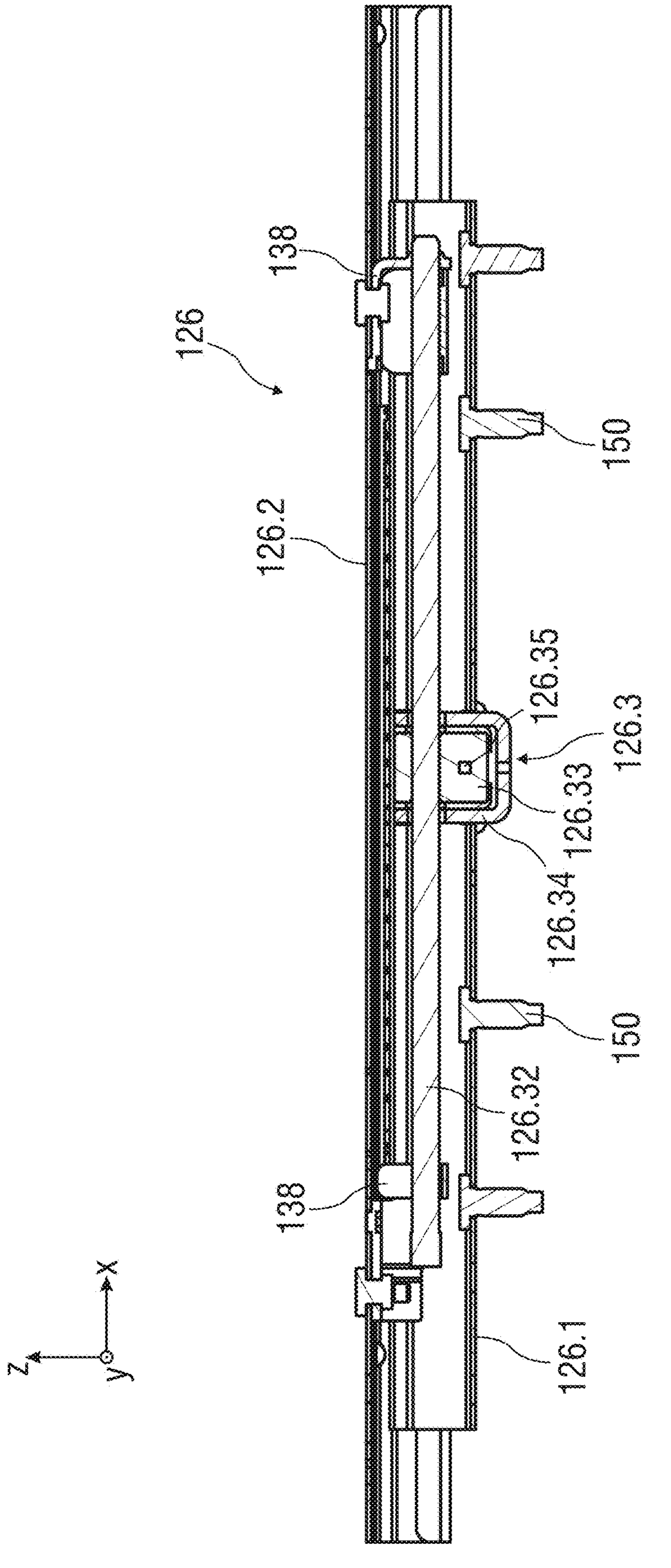
FIG. 6: shows a schematic side view of an armrest rail arrangement for an armrest.

FIG. 6 shows a schematic side view of an armrest rail arrangement 126 for an armrest 120.

The armrest rail arrangement 126 shown in FIG. 6 has a downwardly oriented gear unit 126.3, and is formed substantially inverted relative to the armrest rail arrangement 126 shown in FIG. 3.

The armrest rail arrangement 126 comprises a lower fixed armrest rail 126.1 and an upper armrest rail 126.2 which is movable relative thereto, and a gear unit 126.3 which is fixed to the fixed armrest rail 126.1.

The gear unit 126.3 is for example configured as a spindle gear with a spindle 126.32 and a spindle nut 126.33.

The spindle 126.32 is fixedly connected to the movable armrest rail 126.2. For example, at least two spindle holders 138 are provided which connect the spindle 126.32 to the movable armrest rail 126.2. Thus, the spindle 126.32 and the movable armrest rail 126.2 are connected together in movement.

The spindle nut 126.33 is movably, in particular rotatably mounted in the fixed armrest rail 126.1. For this, the gear unit 126.3 comprises a gear housing 126.34, which is held by form fit and/or force fit in the fixed armrest rail 126.1. The gear housing 126.34 comprises a rotary bearing for the spindle nut 126.33. The spindle nut 126.33 can be driven via a drive screw 126.35.

The spindle 126.32 is mounted via the spindle nut 126.33 so as to be axially movable relative thereto and to the gear housing 126.34 and the fixed armrest rail 126.1. Because of the drive of the gear unit 126.3, the spindle 126.32 can be moved relative to the gear unit 126.3, wherein the armrest 120, which is fixedly connected to the movable armrest rail 126.2, is moved with it.

The fixed armrest rail 126.1 may be connected to a seat structure 140, e.g. a seat base structure or seat carrier structure, and/or to a floor connection structure (not shown in detail), via fastening elements 150. The fastening elements 150 may be screw elements.

Figure 7:
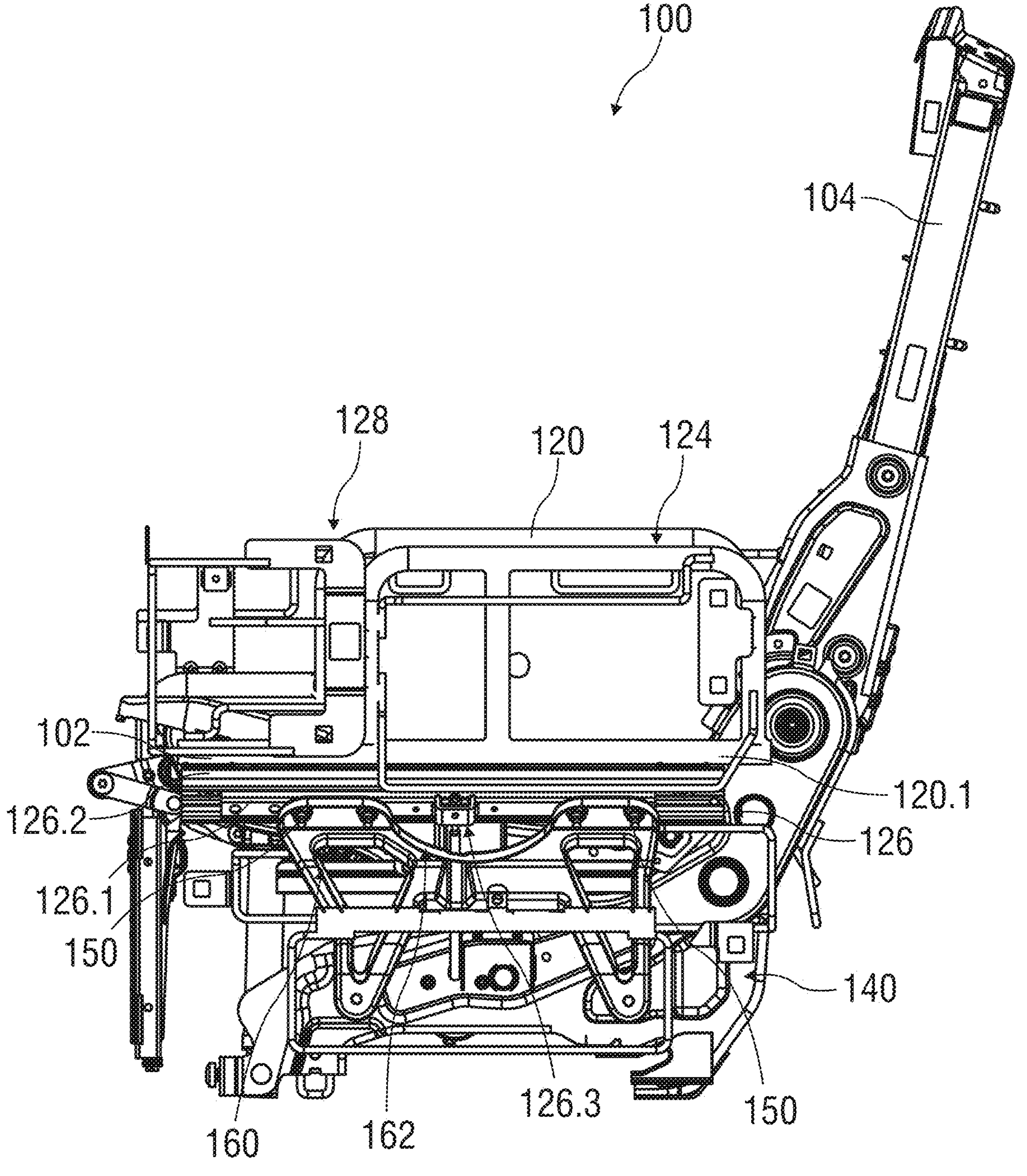
FIG. 7: shows a side view of a vehicle seat with a longitudinally adjustable armrest.

FIG. 7 shows a side view of the vehicle seat 100 with a longitudinally adjustable armrest 120.

The armrest 120 comprises at least the arm support surface 124 for supporting an arm of a user.

For longitudinal adjustment of the armrest 120, this comprises at least one armrest rail arrangement 126.

In particular, an armrest device 200 is formed which comprises the armrest 120 and the armrest rail arrangement 126 for longitudinal adjustment of the armrest 120.

The armrest device 200, in particular the armrest 120, comprises the armrest rail arrangement 126 and the gear unit 126.3, which is couplable via the drive interface 126.31 to an armrest drive unit 132, for example a motorized armrest drive unit 132.

In the exemplary embodiment illustrated, the armrest rail arrangement 126 with the gear unit 126.3 is rotated about a longitudinal axis 134 running in the longitudinal direction x. In other words, the armrest rail arrangement 126 may be oriented tilted towards the vehicle seat 100, in particular towards the seat cushion 102 and/or the backrest 104.

The armrest rail arrangement 126 may be arranged inside the armrest 120, rotated for example in a region 136 from 30° to 90°, or up to 180° relative to the longitudinal axis 134. In the exemplary embodiment shown, the armrest arrangement 126 is rotated by 45°. On a rotation by 90° or 180°, the drive interface 126.31 for coupling to the armrest drive unit 132 points respectively inward in the direction of the vehicle seat 100 or vertically downward.

The armrest rail arrangement 126 is in particular arranged on and attached to an underside 120.1 of the armrest 120 opposite the arm support surface 124, inside the armrest 120.

At least one of the function modules 128 may be arranged in a cavity of the armrest 120, e.g. in a cavity of an armrest frame structure and/or an armrest padding, above the armrest rail arrangement 126.

Furthermore, the armrest device 200 has at least one rail carrier structure 160 assigned to an armrest rail arrangement 126.

Figure 8:
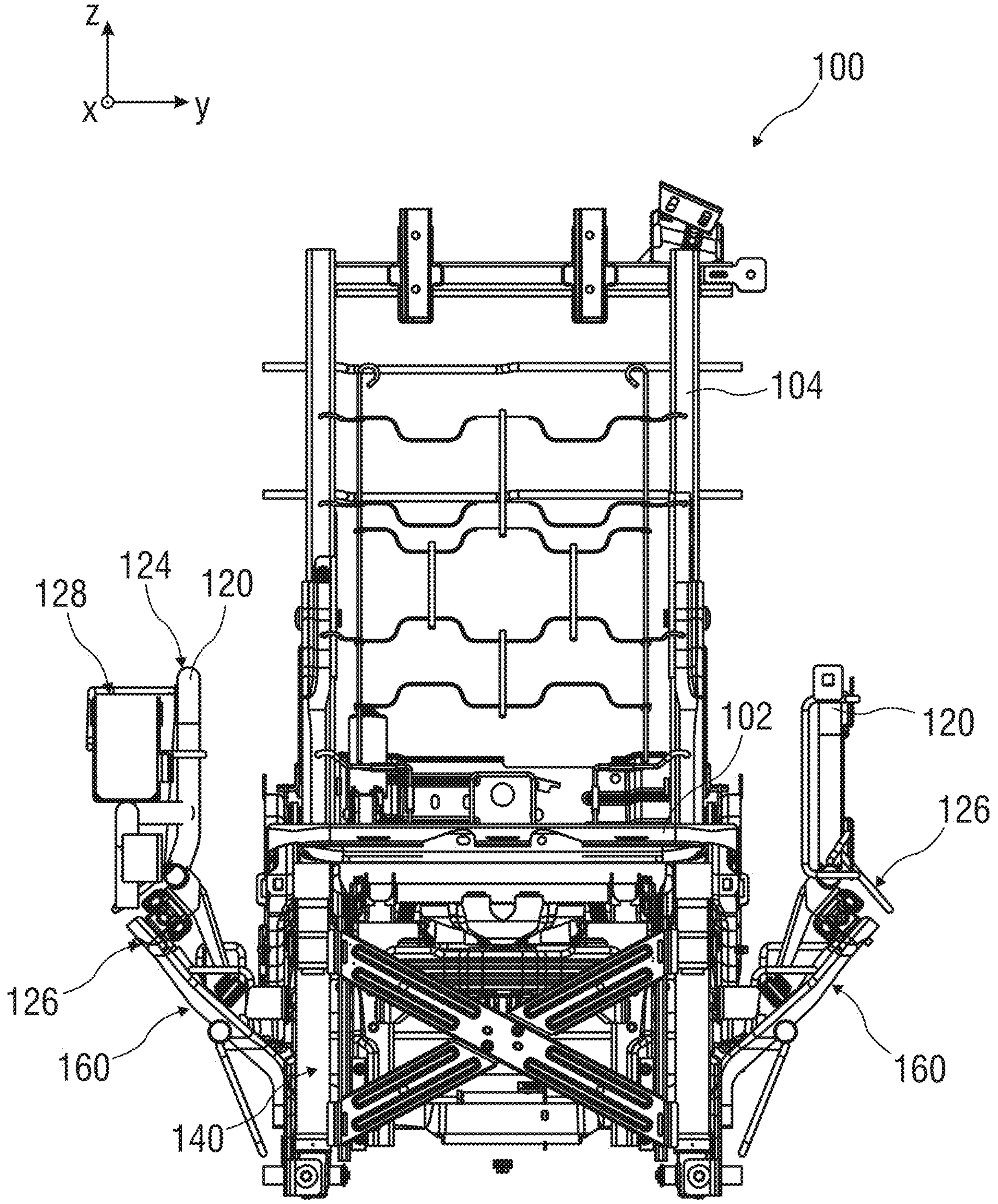
FIG. 8: shows a front view of a vehicle seat with two longitudinally adjustable armrests.

FIG. 8 shows a front view of a vehicle seat 100 with two longitudinally adjustable armrests 120.

A rail carrier structure 160 may be provided on each seat side of the vehicle seat 100 for attaching the armrest rail arrangement 126 to a seat structure 140 and/or to a vehicle floor 118. The respective rail carrier structure 160 may be configured as a carrier plate. The respective rail carrier structure 160 may have a recess 162. The recess 162 may be arranged in the region of the mounted gear unit 126.3 and form a space for arrangement of the gear unit 126.3. On its side opposite the armrest rail arrangement 126, the rail carrier structure 160 may be connected to the seat structure 140 and/or to a seat connection structure and/or to the vehicle floor 118.

Figure 9:
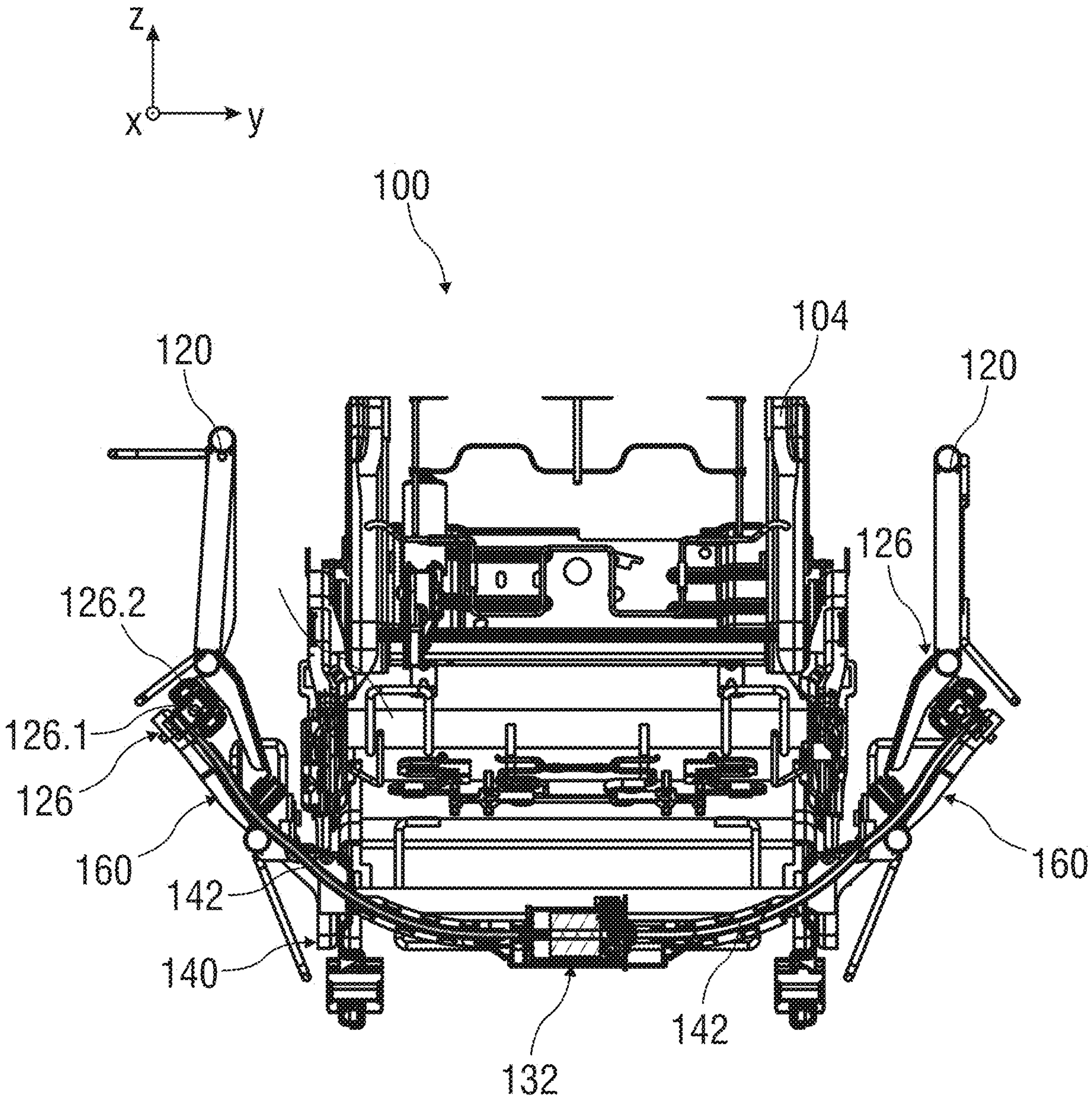
FIG. 9: shows a front view of a vehicle seat with two longitudinally adjustable armrests which are coupled together via an armrest drive unit.

FIG. 9 shows a front view of a vehicle seat 100 with two longitudinally adjustable armrests 120 which are coupled together via an armrest drive unit 132.

The vehicle seat 100 comprises two armrests 120 which are each provided with the above-described armrest rail arrangement 126, which is configured for translational longitudinal adjustment of the respective armrest 120 out of a base position into an extended position. The respective armrest 120 comprises the upwardly oriented arm support surface 124. The armrest rail arrangement 126 is arranged on an underside 120.1 of the respective armrest 120. The respective armrest rail arrangement 126 is oriented parallel to the arm support surface 124 and/or to the underside 120.1 and/or parallel to a horizontal plane 144. In particular, the respective armrest rails 126.1, 126.2 are oriented parallel to the arm support surface 124 and/or to the underside 120.1 and/or parallel to a horizontal plane 144.

The armrest drive unit 132 is arranged below or in the region of a seat structure 140 of the seat cushion 102. The armrest drive unit 132 may be arranged centrally on the seat cushion 102.

A flexible output shaft 142 originates from each end of the armrest drive unit 132. Depending on configuration of the vehicle seat 100, only one armrest 120 may be provided; in this case, only one flexible output shaft 142 originates from the armrest drive unit 132. The armrest drive unit 132 is for example configured as an electric motor.

The respective flexible output shaft 142 is couplable or coupled to the associated gear unit 126.3. Here, the respective flexible output shaft 142 may be couplable or coupled in arcuate form to the associated gear unit 126.3. Because of the orientation of the drive interface 126.31 of the gear unit 126.3, downward or inward in the direction of the seat cushion 102 or in between, in any arbitrary position in the region 136 (illustrated in FIG. 3), the armrest drive unit 132 may be arranged outside the armrest 120, e.g. on the vehicle seat 100, in particular below the vehicle seat 100 or on a long side of the vehicle seat 100. Thus, the armrest 120 may be provided with only the armrest rails 126.1, 126.2 and the gear unit 126.3 and be formed compactly.

LIST OF REFERENCE SIGNS

100 Vehicle seat
102 Seat base
104 Backrest
106 Fitting
108 Rotational axis
110 Longitudinal adjustment device
112 Rail arrangement
114 First rail element (top rail)
116 Second rail element (bottom rail)
118 Vehicle floor
120 Armrest
120.1 Underside
122 Arrow
124 Arm support surface
126 Armrest rail arrangement
126.1 Fixed armrest rail
126.2 Movable armrest rail
126.3 Gear unit
126.31 Drive interface
126.32 Spindle
126.33 Spindle nut
126.34 Gear housing
126.35 Drive screw
128 Function module
130 Adjustment switch
132 Armrest drive unit
134 Longitudinal axis
136 Region
138 Spindle holder

140 Seat structure
142 Output shaft
144 Horizontal plane
150 Fastening element
160 Rail carrier structure
162 Recess
200 Armrest device
X Longitudinal direction
y Transverse direction
Z Vertical direction

The invention claimed is:

1. An armrest device for a vehicle seat, with at least one armrest and an armrest rail arrangement, which is configured for longitudinal adjustment of the at least one armrest out of a base position into an extended position, characterized in that, the armrest rail arrangement comprises at least one fixed armrest rail and an armrest rail which is longitudinally adjustable relative to the at least one fixed armrest rail, and a gear unit, wherein the armrest rail arrangement is arranged on the at least one armrest relative to the longitudinal direction such that a drive interface of the gear unit is oriented downward or upward or in an intermediate position, wherein the armrest rail arrangement is oriented rotated about its longitudinal axis and is inclined relative to an armrest support surface.

2. The armrest device according to claim 1, characterized in that the armrest rail arrangement is arranged on an underside of the at least one armrest opposite the arm support surface.

3. The armrest device according to claim 1, characterized in that the armrest rail arrangement is arranged and fastened inside the at least one armrest.

4. The armrest device according to claim 1, characterized in that a number of function modules are arranged in a cavity of the at least one armrest above the armrest rail arrangement.

5. The armrest device according to claim 4, characterized in that the number of function modules comprises at least a table, a beverage holder, a control unit and/or an adjustment switch for longitudinal adjustment of the at least one armrest.

6. The armrest device according to claim 1, characterized in that the armrest rail arrangement comprises an armrest drive unit which is couplable or coupled to the gear unit via the drive interface.

7. The armrest device according to claim 6, characterized in that the armrest drive unit is arranged below or in the region of the armrest rail arrangement and is couplable or coupled to the gear unit via a flexible drive shaft.

8. The vehicle seat, with at least one seat cushion and an armrest device according to claim 1 which is arranged in the region of the seat cushion.

9. The vehicle seat according to claim 8, characterized in that the armrest device comprises two armrests which are each provided with an armrest rail arrangement, wherein an armrest drive unit of the armrest rail arrangement is arranged below or in the region of a seat structure of the seat cushion and has a flexible drive shaft on both sides, wherein the respective flexible drive shaft is couplable or coupled to an associated gear unit of the respective armrest rail arrangement.

* * * * *